United States Patent
Kamisawa et al.

(10) Patent No.: US 9,799,152 B2
(45) Date of Patent: Oct. 24, 2017

(54) CONTROL DEVICE AND CONTROL SYSTEM

(71) Applicants: Kazunobu Kamisawa, Tochigi (JP); Yosuke Tomita, Aichi (JP)

(72) Inventors: Kazunobu Kamisawa, Tochigi (JP); Yosuke Tomita, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/656,266

(22) Filed: Mar. 12, 2015

(65) Prior Publication Data

US 2015/0259967 A1  Sep. 17, 2015

(30) Foreign Application Priority Data

Mar. 12, 2014 (JP) .................. 2014-049474

(51) Int. Cl.
 *G07C 9/00* (2006.01)
 *E05F 15/77* (2015.01)
 (Continued)

(52) U.S. Cl.
 CPC .......... *G07C 9/00007* (2013.01); *B60R 25/24* (2013.01); *E05F 15/77* (2015.01);
 (Continued)

(58) Field of Classification Search
 CPC . E05F 15/77; E05F 15/79; E05F 15/73; E05F 15/43; E05F 15/76; B60R 25/24;
 (Continued)

(56) References Cited

U.S. PATENT DOCUMENTS 5,929,769 A * 7/1999 Garnault ............. B60R 25/2009
340/12.51
8,091,280 B2 * 1/2012 Hanzel ................ B60R 25/2054
296/146.4
(Continued)

FOREIGN PATENT DOCUMENTS

JP 2006-037410 A 2/2006
JP 2009-030256 A 2/2009
(Continued)

OTHER PUBLICATIONS

Office Action in counterpart Japanese Patent Application No. 2014-049474 dated Dec. 13, 2016 (11 pages).

*Primary Examiner* — Justin Rephann
(74) *Attorney, Agent, or Firm* — Osha Liang LLP

(57) ABSTRACT

A control device of the present disclosure includes a receiver configured to receive a function enabling signal transmitted from a portable machine used to manipulate a vehicle, a determination unit configured to measure a predetermined time since the receiver receives the function enabling signal and determine whether the predetermined time elapses, and an opening and closing body controller configured to control opening and closing of an opening and closing body of the vehicle. The opening and closing body controller controls an opening operation of the opening and closing body based on user's action detected by a sensor, which is provided in or around the opening and closing body to detect the user's action, before the determination unit determines that the predetermined time elapses and after the receiver receives the function enabling signal from the portable machine.

3 Claims, 9 Drawing Sheets

(51) Int. Cl.
*E05F 15/79* (2015.01)
*B60R 25/24* (2013.01)

(52) U.S. Cl.
CPC .......... *E05F 15/79* (2015.01); *G07C 9/00309* (2013.01); *E05Y 2900/531* (2013.01); *G07C 2209/08* (2013.01)

(58) Field of Classification Search
CPC ............ G07C 9/00007; G07C 9/00309; G07C 2209/08; G07C 2209/64; G07C 2209/63; E05Y 2900/531
USPC ....................................................... 49/30, 31
See application file for complete search history.

(56) References Cited

U.S. PATENT DOCUMENTS

| | | | |
|---|---|---|---|
| 8,159,324 B2* | 4/2012 | Zellweger | G07C 9/00309 340/12.28 |
| 8,717,429 B2* | 5/2014 | Giraud | E05B 81/78 348/77 |
| 9,162,685 B2* | 10/2015 | Schindler | B60W 50/08 |
| 9,243,439 B2* | 1/2016 | Adams | E05F 15/73 |
| 2003/0216817 A1* | 11/2003 | Pudney | E05B 81/78 700/17 |
| 2007/0205863 A1* | 9/2007 | Eberhard | B60R 25/2036 340/5.72 |
| 2011/0210821 A1* | 9/2011 | Gehin | G07C 9/00309 340/5.64 |
| 2011/0248820 A1* | 10/2011 | Gehin | G07C 9/00309 340/5.72 |
| 2015/0247352 A1* | 9/2015 | Adams | E05F 15/73 701/2 |

FOREIGN PATENT DOCUMENTS

| | | |
|---|---|---|
| JP | 2010-216182 A | 9/2010 |
| JP | 2011-226222 A | 11/2011 |
| JP | 2012-504716 A | 2/2012 |
| JP | 2012-047012 A | 3/2012 |
| JP | 2013-007171 A | 1/2013 |
| JP | 2013-117134 A | 6/2013 |
| JP | 2013-130055 A | 7/2013 |

* cited by examiner

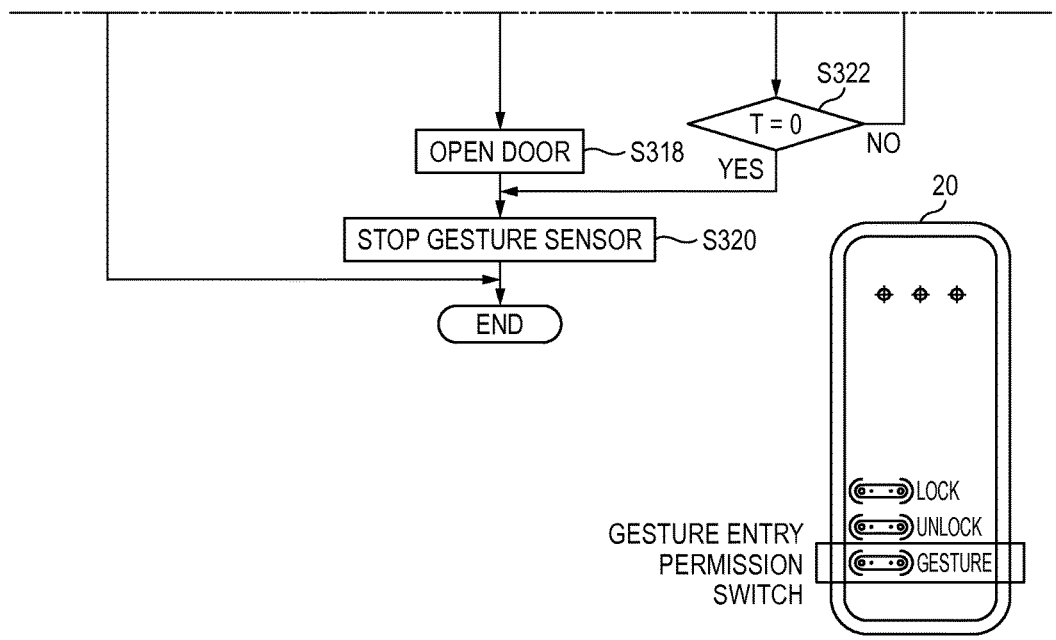

CONTROL DEVICE AND CONTROL SYSTEM

CROSS-REFERENCE TO RELATED APPLICATION

This application is based on Japanese Patent Application No. 2014-049474 filed with the Japan Patent Office on Mar. 12, 2014, the entire contents of which are incorporated herein by reference.

FIELD

The disclosure relates to a control device mounted on a vehicle and a control system provided with the control device and a portable machine. More particularly, the disclosure relates to a control device and a control system for controlling an opening and closing body such as a vehicle door.

BACKGROUND

Conventionally, there is well known wireless communication conducted between a control device of a vehicle and a portable machine locking or unlocking the vehicle or a control system that detects user's action (gesture) to control the unlocking. For example, Unexamined Japanese Patent Publication No. 2011-226222 discloses an in-vehicle instrument automatic control system in which an undesirable activation of an in-vehicle instrument is prevented to cut the power consumption. The automatic control system includes a portable machine that can be brought with a user, an in-vehicle unit that is mounted on the vehicle to be able to conduct communication with the portable machine, and a controller that controls an operation of the in-vehicle instrument mounted on the vehicle based on a communication result between the in-vehicle unit and the portable machine. The portable machine includes a button that issues a command to the in-vehicle unit to lock or unlock a door when a user is away from the vehicle. When the button is pressed, a command signal including an identification number is transmitted, and the in-vehicle unit receives the command signal. The controller permits performance of the locking or unlocking command when successfully authenticating the identification number included in the command signal.

Unexamined Japanese Patent Publication No. 2010-216182 discloses an electric motor-driven type door unlocking device in order to avoid a vehicle door from being undesirably unlocked by a contact of a human body with an unlock sensor or proximity of the human body to the unlock sensor during vehicle wash in which the door needs not to be unlocked. In the electric motor-driven type door unlocking device, when a selection signal is input from a selection unit that outputs the selection signal by a manipulation of the vehicle user, an electric motor-driven type unlocking power generation unit is activated according to unlocking intention detection of a push button while the unlocking intention detection performed by the unlock sensor is disabled. The push button detects the unlocking intention of the vehicle user according to a pressing manipulation performed by the vehicle user.

Unexamined Japanese Patent Publication No. 2009-030256 discloses a vehicle electric motor-driven opening and closing door device in which the operation is ensured to improve user-friendliness. The vehicle electric motor-driven opening and closing door device does not electrically opens and close the door while the user is not authenticated even when a contact detection unit issues a contact signal, but always waits for the user authentication. Therefore, when the user comes close to an area where the authentication can be performed, the user authentication is completed and the door can be opened and closed.

Unexamined Japanese Patent Publication No. 2013-007171 discloses a vehicle door automatic opening and closing device that can improve comfort for the user while cost increase is restrained. In the vehicle door automatic opening and closing device, successively, an obstacle existing on an opening and closing locus of a swing door is detected by a laser radar, a predetermined gesture of the user is detected within a scanning range of a searching wave, and the opening and closing of the swing door or other vehicle doors are automatically started based on a detection result of the gesture.

International Patent Publication No. 2012-504716 also discloses an automatic unlocking device of a vehicle opening and closing panel. The automatic unlocking device optically recognizes predetermined action (gesture) of a part of a human body from a distant place, and an openable and closable panel in front of a place where the action is performed is locked or unlocked in the case that the action is recognized to be the action of a registrant. The action is recognized when a portable identification member is located within a predetermined surrounding range of the vehicle.

Unexamined Japanese Patent Publication No. 2013-117134 discloses an opening and closing control system of a rear opening and closing body that can control an opening operation of the rear opening and closing body without false detection while cost is reduced using a backup camera described in Unexamined Japanese Patent Publication No. 2013-117134. In the opening and closing control system, a detected body is arranged at a position that can visually be recognized by a camera while the rear opening and closing body is closed, the camera is controlled in receiving a signal transmitted from the portable machine, whether the opening operation of the rear opening and closing body is performed is determined based on an image of the position of the detected body imaged by the camera, and the opening operation is controlled.

SUMMARY

One or more embodiments of the disclosure provide a control device, in which the owner of the portable machine and the like can use the function (gesture entry function) of opening or closing the vehicle door by detecting the action such as the body or hand language signal in various situations and the gesture entry function is enabled only for necessary time in order to prevent the false detection of the gesture to cut the power consumption of the vehicle.

According to one or more embodiments of the disclosure, a control device includes: a receiver configured to receive a function enabling signal transmitted from a portable machine used to manipulate a vehicle; a determination unit configured to measure a predetermined time since the receiver receives the function enabling signal and determine whether the predetermined time elapses; and an opening and closing body controller configured to control opening and closing of an opening and closing body of the vehicle. At this point, the opening and closing body controller controls an opening operation of the opening and closing body based on user's action detected by a sensor, which is provided in or around the opening and closing body to detect the user's action, before the determination unit determines that the predetermined time elapses and after the receiver receives the function enabling signal from the portable machine.

Therefore, the control device, in which the false detection caused by the unnecessary action is prevented by restricting the action detection to the predetermined time, the gesture detection function is enabled from the place distant from the vehicle, and the action detection is enabled when the desired passenger gets in the vehicle, can be provided. Additionally, it is not necessary to always detect the action, so that power saving can be achieved on the vehicle side.

The control device may further include an authentication unit configured to authenticate the portable machine. At this point, the authentication unit may authenticate the portable machine at least when the sensor detects the user's action.

Therefore, the authentication is performed to the detection of the action that becomes the condition of the opening operation, so that the high security can be ensured.

The control device may further include a distance determination unit configured to determine a distance from the vehicle to the portable machine. At this point, the opening and closing body controller may control the opening operation of the opening and closing body when a distance, which is determined by the distance determination unit when the sensor detects the user's action, is shorter than a distance, which is determined by the distance determination unit when the receiver receives the function enabling signal.

Therefore, when the owner of the portable machine is coming close to the vehicle although being distant from the vehicle, the opening operation of the opening and closing body is performed by detecting the action of the passenger of the vehicle, which allows the provision of the control device having the user-friendliness and security.

The opening and closing body controller may only open the opening and closing body either having or disposed around a sensor that detects the user's action.

Therefore, the high safety can be ensured by restricting the opening and closing body in which the opening operation is performed.

According to one or more embodiments of the disclosure, an opening and closing body control system includes an opening and closing body of a vehicle, a control device configured to control opening and closing of the opening and closing body, a portable machine configured to transmit a function enabling signal to the control device based on a manipulation, and a sensor provided in or around the opening and closing body to detect user's action. At this point, the control device controls an opening operation of the opening and closing body based on the user's action detected by the sensor within a predetermined time since the function enabling signal is received.

Therefore, the opening and closing body control system according to one or more embodiments of the disclosure may prevent false detection caused by unnecessary action, by restricting the action detection to predetermined time, enabling the gesture detection function from a place distant from the vehicle, and enabling the action detection when the desired passenger gets in the vehicle. Additionally, by restricting detection of the action to the predetermined time, power saving can be achieved on the vehicle side.

The portable machine may include an enabling manipulation unit configured to transmit the function enabling signal.

Therefore, because the function enabling signal is transmitted from the portable machine only by the user's manipulation, the function enabling signal can be transmitted under a confirmation of a user's intention, and an undesirable opening operation can be prevented.

The enabling manipulation unit may be a manipulation unit common to a manipulation unit configured to transmit another signal.

Therefore, a user-friendly portable machine can be provided by providing a manipulation unit in common with, for example, an unlocking manipulation unit and a manipulation unit that remotely starts an engine.

As described above, one or more embodiments of the disclosure can provide the control device, in which the owner of the portable machine and the like can use the function (gesture entry function) of opening or closing the vehicle door by detecting the action such as the body or hand language signal in various situations and the gesture entry function is enabled only for the necessary time in order to prevent the false detection of the gesture to cut the power consumption of the vehicle.

DETAILED DESCRIPTION

Hereinafter, embodiments of the disclosure will be described with reference to the drawings. In embodiments of the disclosure, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

A specific usage scene of a first embodiment will be described below. Conventionally, for example, in the case that a driver wants to get a passenger on a vehicle earlier than the driver gets on the vehicle, the driver takes a lot of trouble such that the drive hands a portable machine over to the passenger, or such that the driver manipulates the portable machine according to passenger boarding timing. Particularly, in the case that the driver has luggage, the driver takes a trouble of laying down the luggage in order to take out the portable machine. In the first embodiment, when the portable machine is previously manipulated to enable a gesture entry function, it is not necessary for the driver to hand the portable machine over to the passenger, and it is not necessary to manipulate the portable machine according to the passenger boarding timing.

It is assumed that the user gets out of the vehicle to go shopping at a shopping mall, and then the user heads down to the vehicle with the luggage. When the gesture entry function is enabled by the manipulation of the portable machine while the luggage is laid down at an entrance of the shopping mall, an opening and closing body such as a slide door and a trunk can be opened by performing action (gesture) at a time point the driver reaches the vehicle, but it is not necessary for the driver to lay down the luggage to manipulate a door handle. Particularly, it is convenient that the opening and closing body can smoothly be opened when it is raining.

Figure 1:
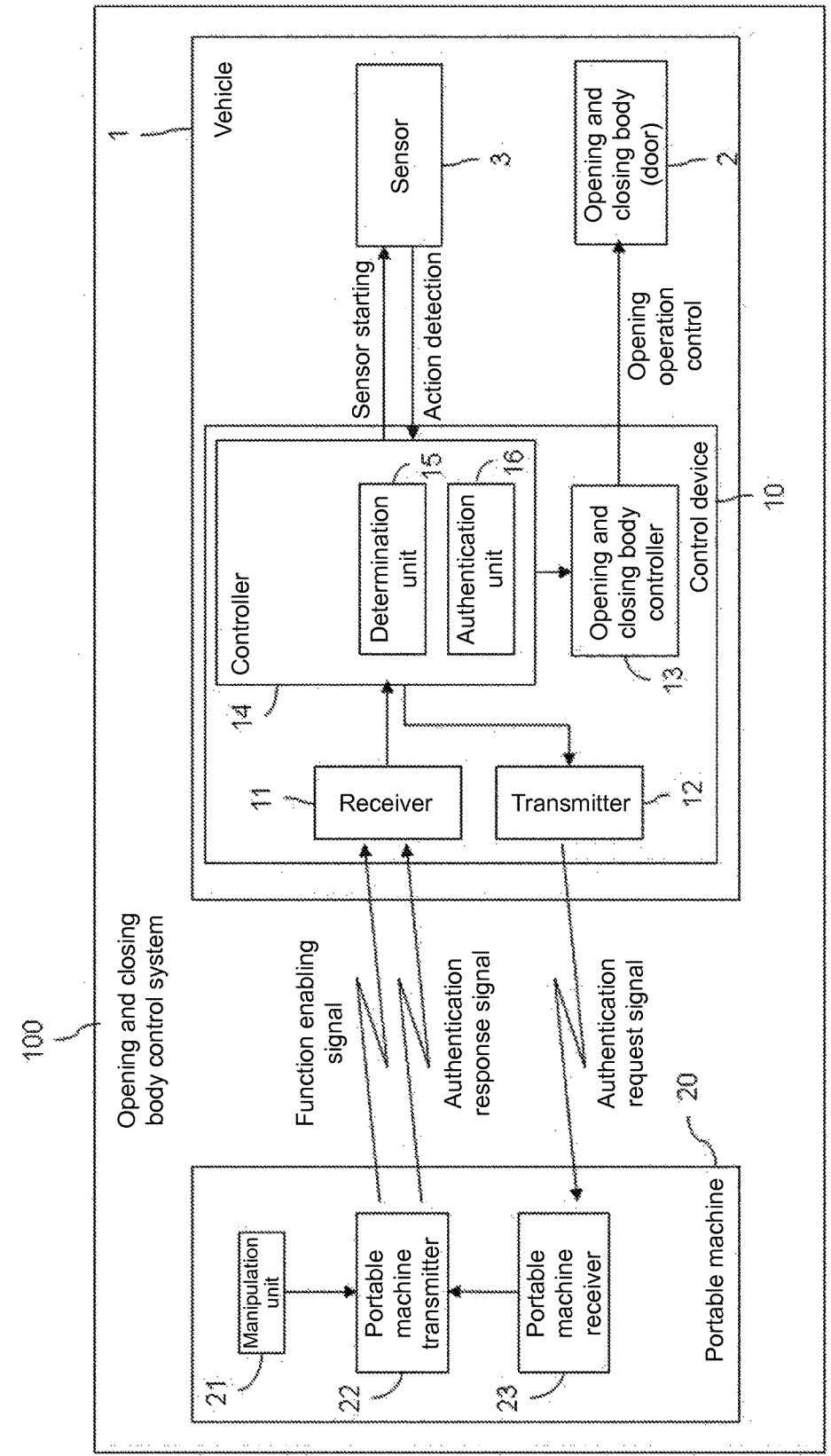
FIG. 1 is a block diagram illustrating an opening and closing body control system according to a first embodiment of the disclosure.
Figure 2:
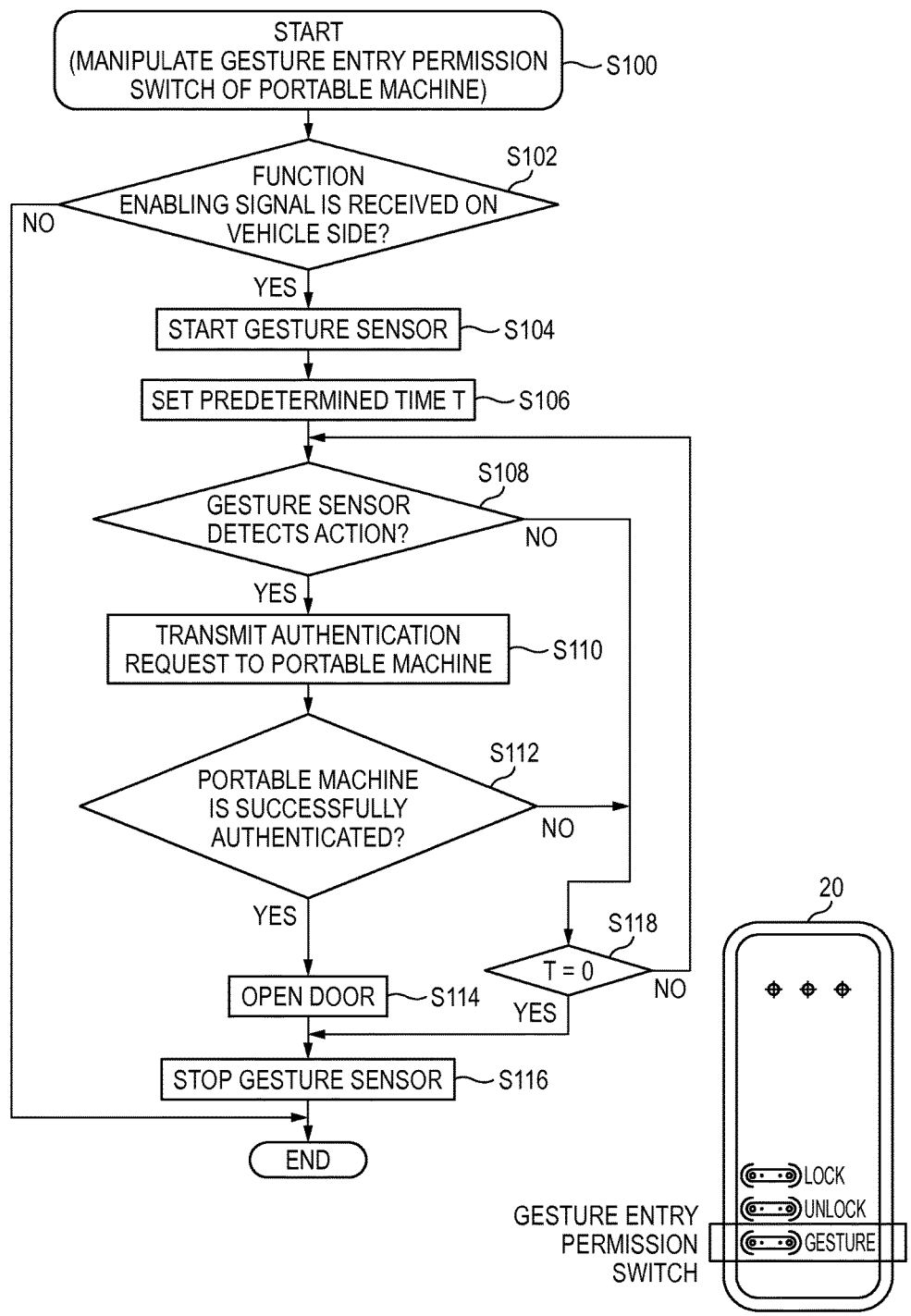
FIG. 2 is a flowchart illustrating a control step in an opening and closing body control device of the first embodiment and a front view of a portable machine.
Figure 3:
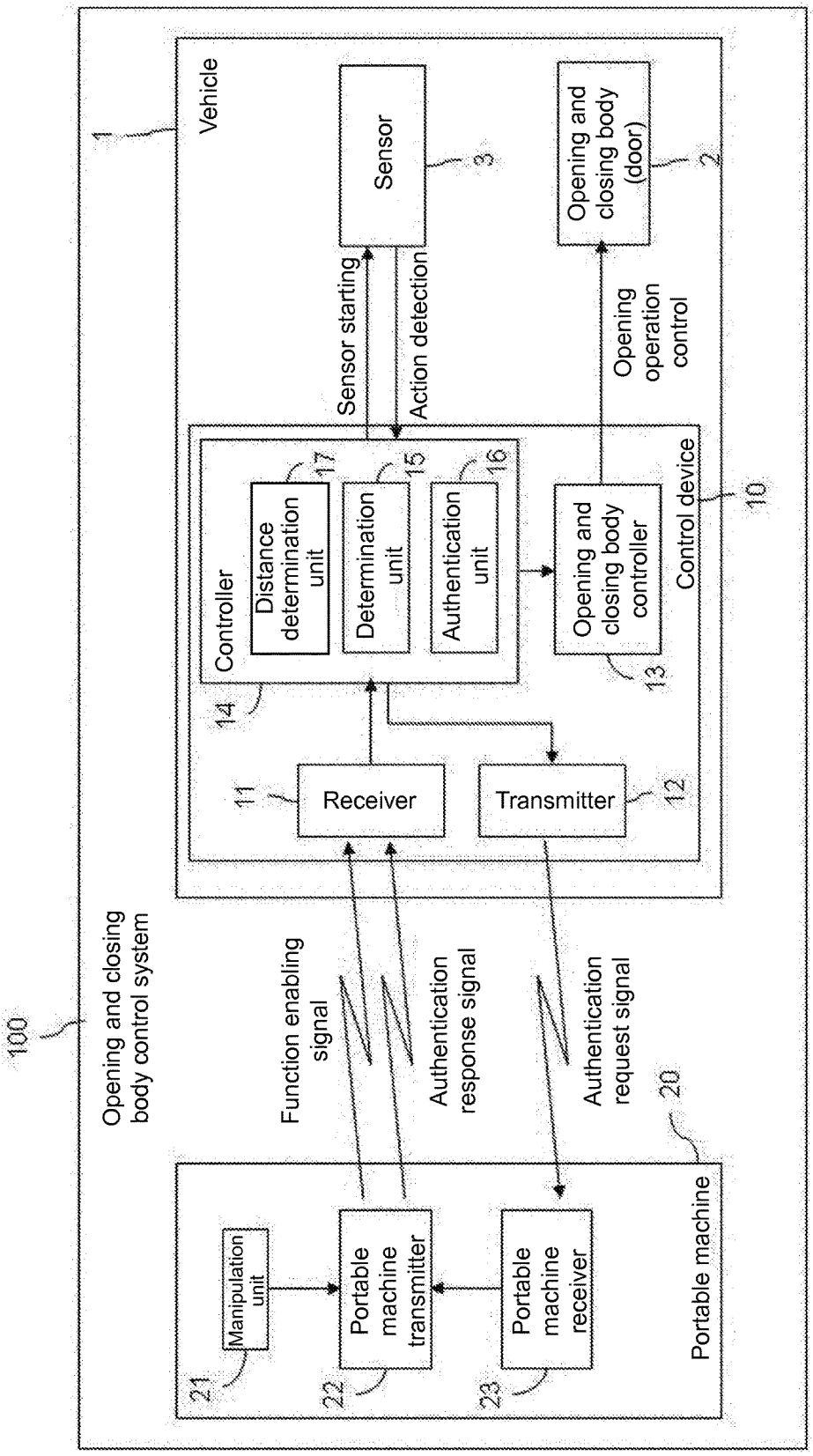
FIG. 3 is a block diagram illustrating an opening and closing body control system according to a first modification of the first embodiment.

An opening and closing body control system 100 of the first embodiment will be described with reference to FIGS. 1 and 2. The opening and closing body control system 100 includes an opening and closing body 2 that is provided in a vehicle 1, a sensor 3 that detects a user's action, and a control device 10 that control opening and closing of the opening and closing body 2. The opening and closing body control system 100 also includes a portable machine 20. The portable machine 20 is carried by the user of the vehicle 1, and receives the manipulation from the user of the vehicle 1 to conduct wireless communication with the control device 10.

The opening and closing body 2 may be not only the door (including the slide door) of the vehicle 1 through which a person gets in or out of but also a door or a tailgate and a trunk through which the luggage is taken in and out. Any sensor is used as the sensor 3 as long as the sensor can detect the action (gesture) such as a body or hand language signal within a gesture detection range. For example, an optical system imaging sensor such as a CCD camera, a laser radar that catches a target by beam scanning, and an infrared sensor or a proximity sensor may be used as the sensor 3. The sensor 3 is provided in the opening and closing body 2 or a neighborhood of the opening and closing body 2 to detect the action of the person existing on a lateral or rear side of the vehicle 1.

The gesture detection range is previously set to an optimum range as appropriate, because the user's action can hardly be detected when the gesture detection range is set to an excessively narrow range, or because false detection or a security problem occurs when the gesture detection range is set to an excessively wide range. Predetermined action to be detected is defined, and a predetermined operation of the vehicle may be performed when the predetermined action is detected. As used herein, for example, the predetermined operation means an opening operation of the opening and closing body or an unlock operation of the door. Even if the user's hands are filled of the luggage, the sensor 3 detects the action of a foot and the like of the user, which allows the user to open the opening and closing body 2 such as the door or trunk of the vehicle 1 without using his/her hand.

The control device 10 includes a receiver 11 that receives a wireless signal from the portable machine 20, a transmitter 12 that transmits the wireless signal to the portable machine 20, an opening and closing body controller 13 that opens and closes the opening and closing body 2 of the vehicle 1, and a controller 14 that controls the transmission and reception to and from the portable machine 20, the opening and closing body controller 13, and the sensor 3. The receiver 11 receives a function enabling signal that is transmitted from the portable machine 20 manipulating the vehicle 1. The portable machine 20 includes a portable machine receiver 23 that receives the signal from the transmitter 12 of the vehicle 1, a portable machine transmitter 22 that transmits the function enabling signal to the receiver 11 of the vehicle 1, and a manipulation unit 21 that receives a user's manipulation.

In the portable machine 20, when the manipulation unit 21 receives the user's manipulation, the portable machine transmitter 22 transmits the function enabling signal that starts the sensor 3 of the vehicle 1 to enable the gesture detection function. There is no particular limitation to a kind and the number of the manipulation units 21 of the portable machine 20 as long as the manipulation unit 21 is a switch, such as a push button, which receives the user's manipulation. For example, as described later, the manipulation unit 21 may be a dedicated switch that enables the sensor 3, or a switch that is also used in other functions.

In the case that the manipulation unit 21 is the dedicated switch that enables the sensor 3, the portable machine includes a enabling manipulation unit that transmits the function enabling signal. Therefore, because the function enabling signal is transmitted from the portable machine only by the user's manipulation, the function enabling signal can be transmitted under a confirmation of a user's intention, and an undesirable opening operation can be prevented. In the case that the enabling manipulation unit is also used in other functions, the manipulation unit becomes common to a manipulation unit that transmits another signal. Therefore, a user-friendly portable machine can be provided by providing a manipulation unit in common with, for example, an unlocking manipulation unit and a manipulation unit that remotely starts an engine.

The controller 14 on the side of the vehicle 1 includes a determination unit 15. The determination unit 15 transmits and receives the information to and from the portable machine 20, controls the opening and closing body controller 13 and the sensor 3, and measures the predetermined time since the receiver 11 receives the function enabling signal to determine whether the predetermined time elapses. When receiving the function enabling signal, the receiver 11 transmits the reception of the function enabling signal to the controller 14. When receiving the transmission of the function enabling signal from the receiver 11, the controller 14 starts the sensor 3 such that the sensor 3 is put into a state enabling the gesture detection. The sensor 3 can detect the action only during a period until the determination unit 15 determines that the predetermined time elapses to stop the sensor 3 since the sensor 3 is put into a state enabling the gesture detection. The predetermined time measured by the determination unit 15 defines the time for which the sensor 3 actually detects the action, the user's action can hardly be detected when the predetermined time is excessively short, the false detection or security problem is generated when the predetermined time is excessively long. Therefore, the predetermined time is previously set to the optimum time as appropriate.

After the receiver 11 receives the function enabling signal, namely, after the sensor 3 is started, the opening and closing body controller 13 controls the opening operation of the opening and closing body 2 based on the action that is detected by the sensor 3 before the determination unit 15 determines that the predetermined time elapses. That is, the opening and closing body controller 13 controls the opening operation of the opening and closing body 2 based on the user's action that is detected within the predetermined time by the sensor 3 after the function enabling signal is received. The false detection caused by the unnecessary action can thus be prevented by restricting the detection of the user's action to the predetermined time. The gesture detection function is enabled even from a place distant from the vehicle 1 using the portable machine 20, so that the detection of the user's action can be enabled when the desired passenger gets in the vehicle 1. It is not necessary that the sensor 3 always detect the user's action, so that power saving can be achieved on the vehicle side.

The opening and closing body controller 13 may control the opening operation only of the opening and closing body 2 in which the sensor 3 having detected the user's action is provided or the opening and closing body 2 around the sensor 3. Thus, the high safety can be ensured by restricting the opening and closing body in which the opening operation is performed. The sensor 3 is provided in each opening and closing body 2 or each of both the lateral surfaces and the rear side of the vehicle 1. In the case that the sensor 3 is provided in each opening and closing body 2, the opening and closing body controller 13 may perform the opening operation only of the opening and closing body 2 in which the sensor 3 having detected the user's action is provided. In the case that the sensor 3 is provided in each of both the lateral surfaces and the rear side of the vehicle 1, the opening and closing body controller 13 may perform the opening operation only of the opening and closing body 2 on the side on which the sensor 3 having detected the user's action is provided.

The controller 14 also includes an authentication unit 16 that authenticates the portable machine 20. Preferably the authentication unit 16 authenticates the portable machine 20 when the sensor 3 detects the user's action. In this case, the portable machine 20 includes the portable machine receiver 23 that receives an authentication request signal from the transmitter 12 of the vehicle 1. The authentication unit 16 also authenticates the portable machine 20 when receiving the function enabling signal from the portable machine 20, and the sensor 3 is started only when the authentication unit 16 successfully authenticates the portable machine 20. The controller 14 may directly perform the opening operation of the opening and closing body 2 when the sensor 3 detects the user's action. However, because there is a certain level of time difference until the sensor 3 detects the user's action since the function enabling signal is received, preferably the portable machine 20 is authenticated again when the sensor 3 detects the user's action. The authentication unit 16 may authenticate the portable machine 20 at another time.

When the controller 14 recognizes that the sensor 3 detects the user's action, the transmitter 12 of the control device 10 transmits the authentication request signal making a authentication request to the portable machine 20 under the control of the controller 14. When the portable machine receiver 23 receives the authentication request signal, the portable machine transmitter 22 sends back an authentication response signal including previously-set authentication code of the portable machine 20 to the receiver 11 of the vehicle 1. The receiver 11 transmits the received authentication code to the authentication unit 16. The authentication unit 16 determines whether the received authentication code is normal. When the received authentication code is normal, the controller 14 issues an instruction to the opening and closing body controller 13 to perform the opening operation. Therefore, the authentication is performed to the detection of the user's action that becomes the condition of the opening operation, so that the high security can be ensured.

A method for controlling the control device 10 will be described with reference to FIG. 2. S in the flowchart means a step. As illustrated in FIG. 2, the portable machine 20 of the first embodiment includes a gesture entry permission switch that enables the user's action detection function as the manipulation unit 21.

In S100, the user manipulates the gesture entry permission switch of the portable machine 20. In S102, the receiver 11 of the control device 10 on the side of the vehicle 1 checks whether the function enabling signal is received. When the manipulation unit 21 of the gesture entry permission switch is manipulated, the portable machine 20 transmits the function enabling signal from the portable machine transmitter 22.

When the receiver 11 receives the function enabling signal, the controller 14 starts the sensor 3 such that the sensor 3 can detect the user's action in S104. In S106, at the same time as the controller 14 starts the sensor 3, the determination unit 15 sets the predetermined time for which the sensor 3 detects the user's action when the receiver 11 receives the function enabling signal. In S118, the determination unit 15 measures the predetermined time since the receiver 11 receives the function enabling signal, and the determination unit 15 determines whether the predetermined time elapses. When the receiver 11 does not receive the function enabling signal in S102, nothing is performed to terminate the processing.

During the predetermined time, the controller 14 continuously checks whether the sensor 3 detects the user's action in S108. When the sensor 3 detects the user's action, the transmitter 12 transmits the authentication request signal to the portable machine 20 in S110. Because the portable machine 20 that receives the authentication request signal sends back the authentication response signal including the set authentication code, the authentication unit 16 checks whether the sent-back authentication code is normal, namely, whether the portable machine 20 is successfully authenticated in S112.

When the authentication unit 16 checks that the sent-back authentication code is not normal, the controller 14 returns from S118 to S108 to continuously checks whether the sensor 3 detects the user's action again until the predetermined time elapses. When the authentication code is normal to successfully perform the authentication, the opening and closing body controller 13 performs the opening operation of the opening and closing body 2 in S114. After the opening operation of the opening and closing body 2, the controller 14 stops the sensor 3 in S116 in order to prevent the malfunction. When the predetermined time elapses while the sensor 3 does not detects the user's action, the sensor 3 is also stopped. In this case, the controller 14 may stop the detection function of the sensor 3, or the controller 14 may ignore the detection result of the sensor 3 although the sensor 3 detects the user's action. In this case, preferably energization of the sensor 3 is stopped because the power saving is achieved on the vehicle side.

Thus, the first embodiment can provide the control device 10 and control system 100, in which the false detection caused by the unnecessary action is prevented by restricting the user's action detection to the predetermined time, the gesture detection function is enabled from the place distant from the vehicle using the portable machine 20, and the user's action detection is enabled when the desired passenger gets in the vehicle. It is not necessary to always detect the user's action, so that power saving can be achieved on the vehicle side.

First Modification of First Embodiment

A first modification of the first embodiment will be described with reference to FIGS. 3 to 6. A point different from the first embodiment will mainly be described to avoid the overlapping description.

The controller 14 further includes a distance determination unit 17 that determines a distance from the vehicle 1 to the portable machine 20. Usually the transmitter 12 of the control device 10 conducts wireless communication with the portable machine receiver 23 of the portable machine 20 using an LF (Low Frequency)-band radio wave. Usually the portable machine transmitter 22 of the control device 20 conducts wireless communication with the portable machine receiver 11 of the portable machine 10 using an UHF (Ultra High Frequency)-band radio wave.

For example, when receiving the LF-band authentication request signal from the vehicle 1, the portable machine 20 measures LF intensity (RSSI: Receive Signal Strength Indication), and the portable machine 20 transmits LF intensity information while carrying the LF intensity information on the UHF-band authentication response signal. When the receiver 11 receives the authentication response signal, the authentication response signal is transmitted to the distance determination unit 17, the distance determination unit 17 determines the distance to the portable machine 20 based on the LF intensity information in the authentication response signal. The distance determination unit 17 may not determine the distance based on the LF intensity information transmitted from the portable machine 20, but determine the distance by measuring reception intensity of the function enabling signal transmitted from the portable machine 20. In this case, the LF-band radio wave or the UHF-band radio wave are properly used.

The distance determination unit 17 can determine whether the determined distance to the portable machine 20 falls within a previously-set enabling range of the sensor 3 from the vehicle 1, or whether the portable machine 20 is coming close to the vehicle 1 by determining the distances at two time points. When the distance that is determined by the distance determination unit 17 when the sensor 3 detects the user's action is shorter than the distance that is determined when the receiver 11 receives the function enabling signal, the opening and closing body controller 13 may control the opening operation of the opening and closing body 2.

The sensor 3 is started by the function enabling signal, and the transmitter 22 transmits the authentication request signal in the LF band when the sensor 3 detects the user's action. The portable machine 20 transmits the LF intensity information based on the received LF-band authentication request signal with the LF intensity information added to authentication response signal. The distance determination unit 17 determines the distance between the vehicle 1 and the portable machine 20 at a time point the portable machine 20 transmits the authentication response signal based on the LF intensity information. When determining the distance based on the reception intensity of the function enabling signal, the distance determination unit 17 determines the distance by measuring the reception intensity of the received function enabling signal.

The distance determination unit 17 compares the distance in transmitting the function enabling signal to the distance in transmitting the authentication response signal, and can recognize that the owner of the portable machine is coming close to the vehicle 1 when the distance in transmitting the authentication response signal is shorter than the distance in transmitting the function enabling signal. When the owner of the portable machine is coming close to the vehicle 1 although being distant from the vehicle, the opening operation of the opening and closing body is performed by detecting the user's action of the passenger of the vehicle 1, which allows the provision of the control device having the user-friendliness and security.

Figure 4:
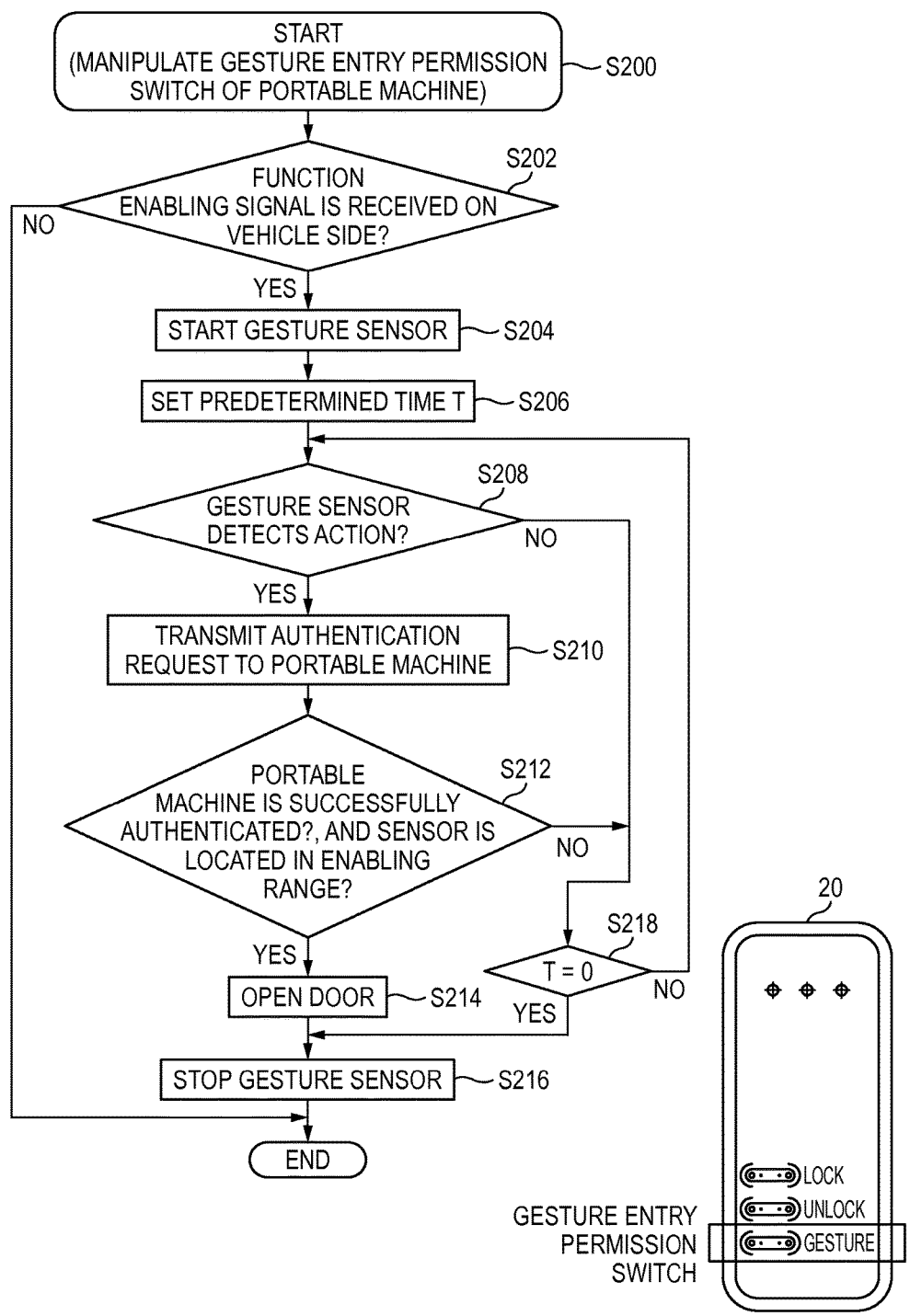
FIG. 4 is a flowchart (in the case that a distance is determined) illustrating a control step in the opening and closing body control device of the first modification of the first embodiment and a front view of a portable machine.

A method for controlling the control device 10 will be described with reference to FIG. 4. A point different from the first embodiment in FIG. 2 will mainly be described to avoid the overlapping description. S200 to S210 are similar to S100 to S110 of the first embodiment.

When the sensor 3 detects the user's action after the function is enabled, the transmitter 12 transmits the LF-band authentication request signal to the portable machine 20 in S210. Because the portable machine 20 that receives the authentication request signal sends back the authentication response signal including the set authentication code and LF intensity information, the authentication unit 16 checks whether the sent-back authentication code is normal, namely, whether the portable machine 20 is successfully authenticated in S212. At the same time, the distance determination unit 17 determines the distance from the vehicle 1 at the time point the portable machine 20 transmits the authentication response signal based on the sent-back LF intensity information, and checks whether the distance to the portable machine 20 falls within the sensor enabling range.

When the authentication unit 16 checks that the sent-back authentication code is not normal, or when the distance determination unit 17 determines that the portable machine 20 is located out of the sensor enabling range, the controller 14 returns from S218 to S208, and continuously checks whether the sensor 3 detects the user's action again until the predetermined time elapses. When the authentication unit 16 checks that the sent-back authentication code is normal, and when the distance determination unit 17 determines that the portable machine 20 falls within the sensor enabling range, the opening and closing body controller 13 performs the opening operation of the opening and closing body 2 in S214. After the opening operation of the opening and closing body 2, the controller 14 stops the sensor 3 in S216 in order to prevent the malfunction. Thus, only when the portable machine 20 falls within the sensor enabling range while being successfully authenticated, the gesture entry having the higher security and safety can be implemented by performing the opening operation of the door.

Figure 5:
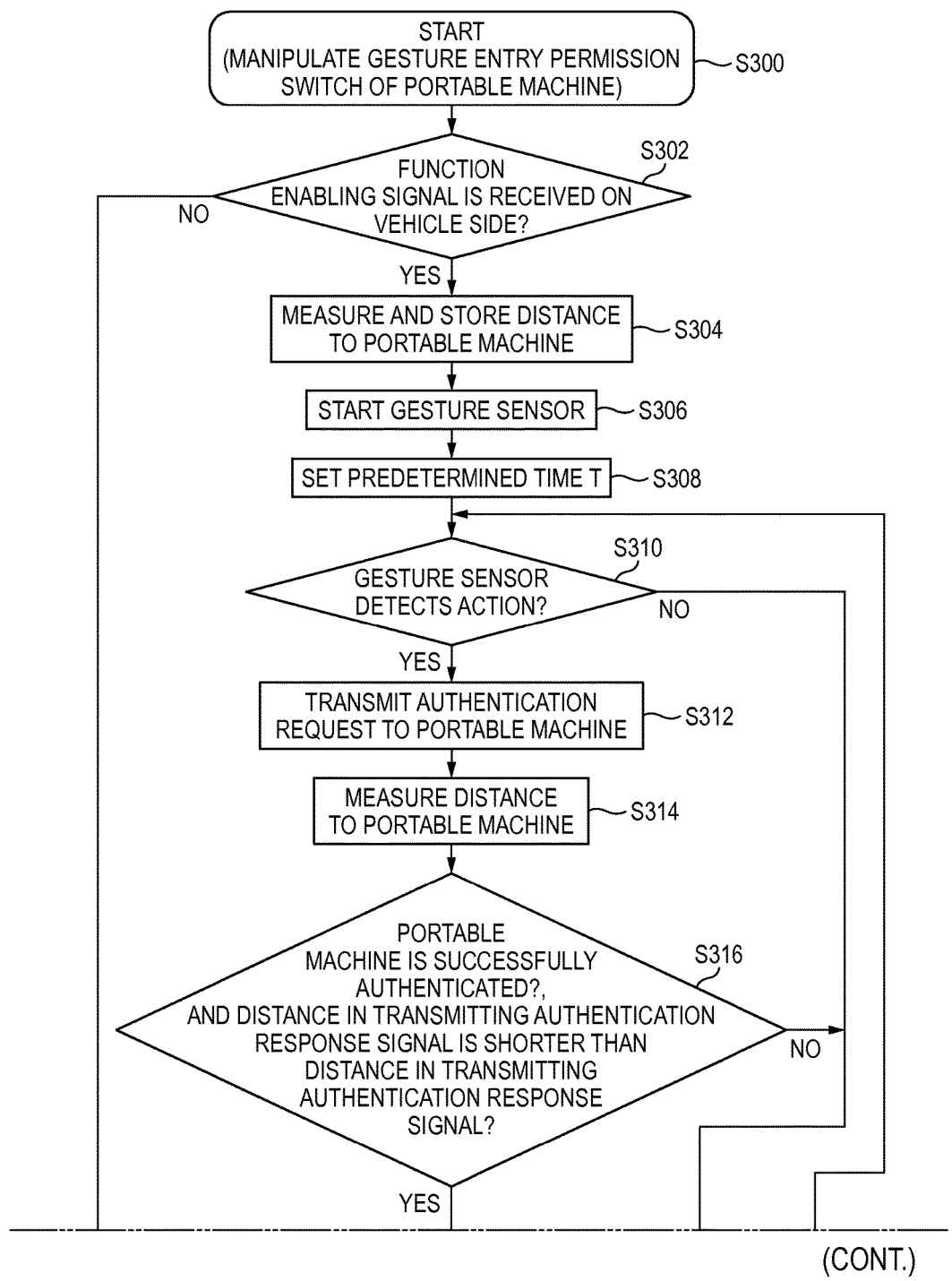
FIG. 5 is a flowchart (in the case that the distance is determined twice) illustrating the control step in the opening and closing body control device of the first modification of the first embodiment and a front view of the portable machine.

In the first modification, the opening operation is performed based on the distance to the portable machine 20 that is obtained from the LF intensity information at one time point. Alternatively, as illustrated in FIG. 5, the opening operation may be performed based on the distances to the portable machine 20 at two time points. In S300, the user manipulates the gesture entry permission switch of the portable machine 20. In S302, the receiver 11 checks whether the function enabling signal is received.

When the receiver 11 receives the function enabling signal, the distance determination unit 17 determines the distance by measuring the reception intensity based on the function enabling signal, and stores the distance in S304. In S306, the controller 14 starts the sensor 3 such that the sensor 3 can detect the action. In S308, at the same time as the controller 14 starts the sensor 3, the determination unit 15 sets the predetermined time for which the sensor 3 detects the user's action when the receiver 11 receives the function enabling signal. In S322, the determination unit 15 measures the predetermined time since the receiver 11 receives the function enabling signal, and the determination unit 15 determines whether the predetermined time elapses.

During the predetermined time, the controller 14 continuously checks whether the sensor 3 detects the user's action in S310. When the sensor 3 detects the user's action, the transmitter 12 transmits the LF-band authentication request signal to the portable machine 20 in S312. Because the portable machine 20 that receives the authentication request signal sends back the authentication response signal including the set authentication code and the LF intensity information, the distance determination unit 17 determines the distance between the vehicle 1 and the portable machine 20 at the time point the portable machine 20 transmits the authentication request signal based on the LF intensity information in S314.

In S316, the authentication unit 16 checks whether the portable machine 20 is successfully authenticated, and the distance determination unit 17 compares the distance in transmitting the function enabling signal to the distance in transmitting the authentication response signal, and checks whether the distance in transmitting the authentication response signal is shorter than the distance in transmitting the function enabling signal. When the distance in transmitting the authentication response signal is shorter than the distance in transmitting the function enabling signal, because the owner of the portable machine is coming close to the vehicle 1, the opening and closing body controller 13 performs the opening operation of the opening and closing body 2 in S318. When the owner of the portable machine is coming close to the vehicle 1 although being distant from the vehicle, the opening operation of the opening and closing body is performed by detecting the user's action of the passenger of the vehicle 1, which allows the provision of the control device having the user-friendliness and security.

Second Modification of First Embodiment

Figure 6:
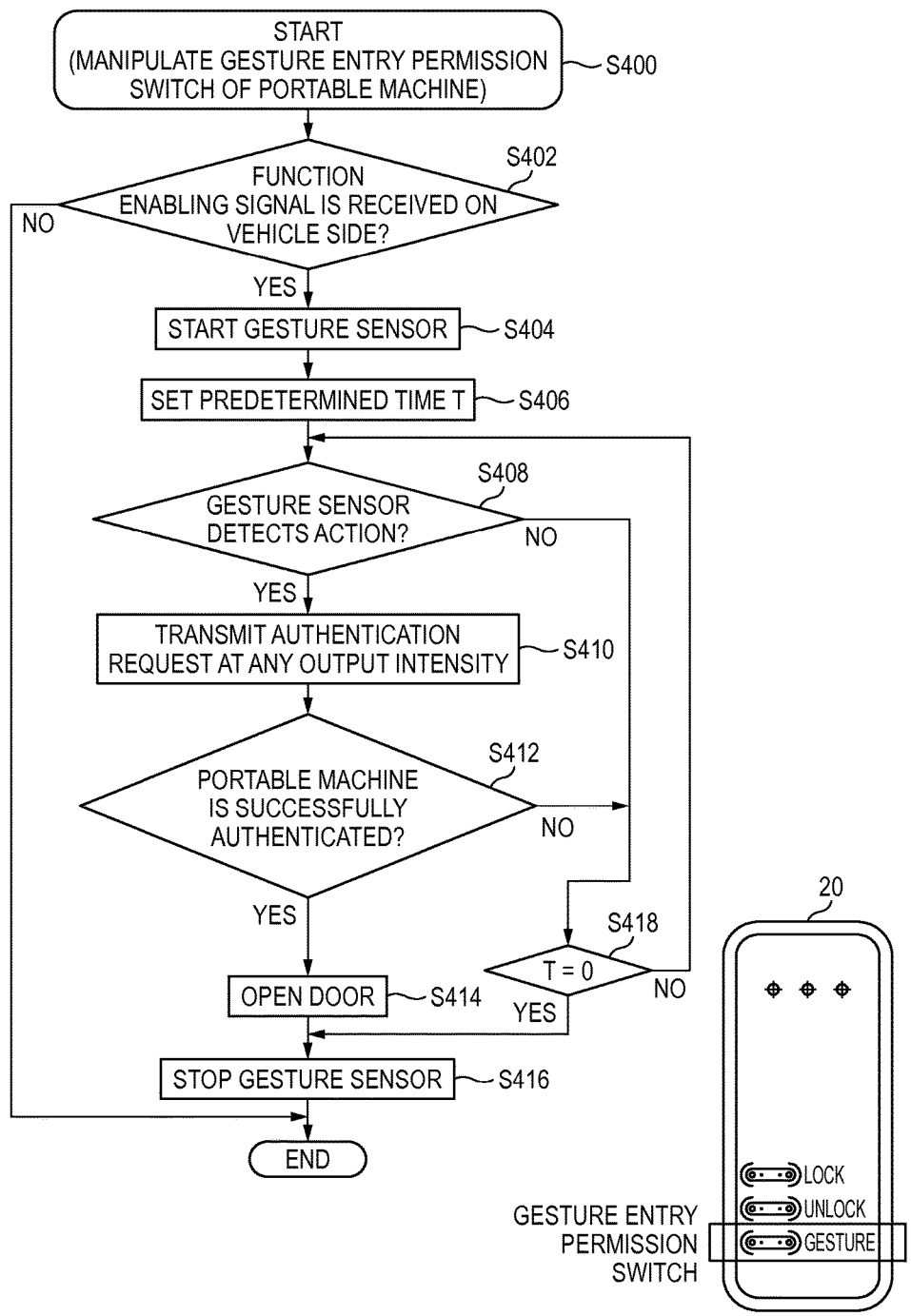
FIG. 6 is a flowchart (in the case that a transmission signal is adjusted) illustrating a control step in an opening and closing body control device according to a second modification of the first embodiment and a front view of a portable machine.

A method for controlling the control device 10 according to a second modification of the first embodiment will be described with reference to FIG. 6. S400 to S08 are similar to S100 to S108 of the first embodiment. When the sensor 3 detects the action after the function is enabled, the transmitter 12 transmits the LF-band authentication request signal to the portable machine 20 at any output intensity in S410. As used herein, for example, any output intensity means that, when the transmitter 12 transmits the authentication request signal, the transmission intensity is set smaller than other cases. Therefore, unless the portable machine 20 is located closer to the vehicle than the position at which the function enabling signal is transmitted, the portable machine 20 can neither receive the authentication request signal nor send back the authentication response signal.

Because the portable machine 20 that receives the authentication request signal sends back the authentication response signal including the set authentication code even if the transmission intensity is decreased, the authentication unit 16 checks whether the portable machine 20 is successfully authenticated in S412. When the authentication is successfully performed, the opening and closing body controller 13 performs the opening operation of the opening and closing body 2 in S414. The output intensity of the transmitter 12 on the side of the vehicle 1 may be decreased as described above, or the output intensity of the portable machine transmitter 22 on the side of the portable machine 20 may be decreased. Thus, the gesture entry having the higher security and safety can be implemented by authenticating the position of the portable machine in the narrower range when the sensor 3 detects the user's action.

Second Embodiment

Figure 7:
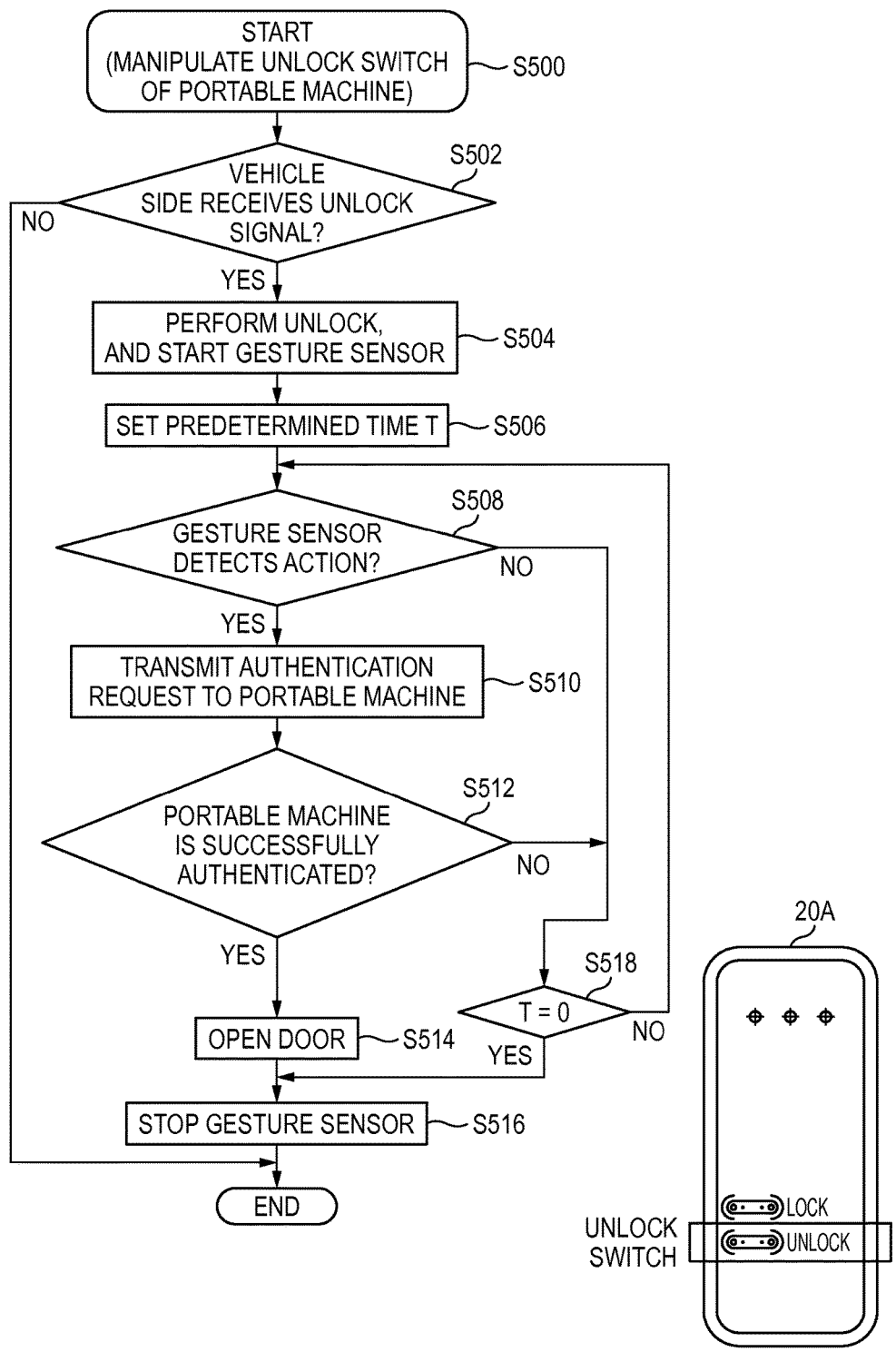
FIG. 7 is a flowchart illustrating a control step in an opening and closing body control device according to a second embodiment of the disclosure and a front view of a portable machine.

A method for controlling a control device according to a second embodiment that conducts wireless communication with a portable machine 20A will be described with reference to FIG. 7. The portable machine 20A includes a lock switch (Lock) and unlock switch (Unlock) as the manipulation unit. However, the portable machine 20A does not include a switch dedicated to the gesture entry unlike the first embodiment, but the switch is shared with the unlock switch.

In S500, the user manipulates the unlock switch of the portable machine 20A. In S502, the receiver on the vehicle side checks whether an unlock signal is received. When the unlock switch is manipulated, the portable machine 20A transmits an unlock signal. The portable machine 20A may transmit the function enabling signal together with the unlock signal when the unlock switch is manipulated. When the receiver on the vehicle side receives the unlock signal, the controller starts the sensor while unlocking the opening and closing body in S504. The subsequent control (S506 to S518) is similar to S106 to S118. Therefore, the user-friendly portable machine having the gesture entry function can be provided.

Third Embodiment

Figure 8:
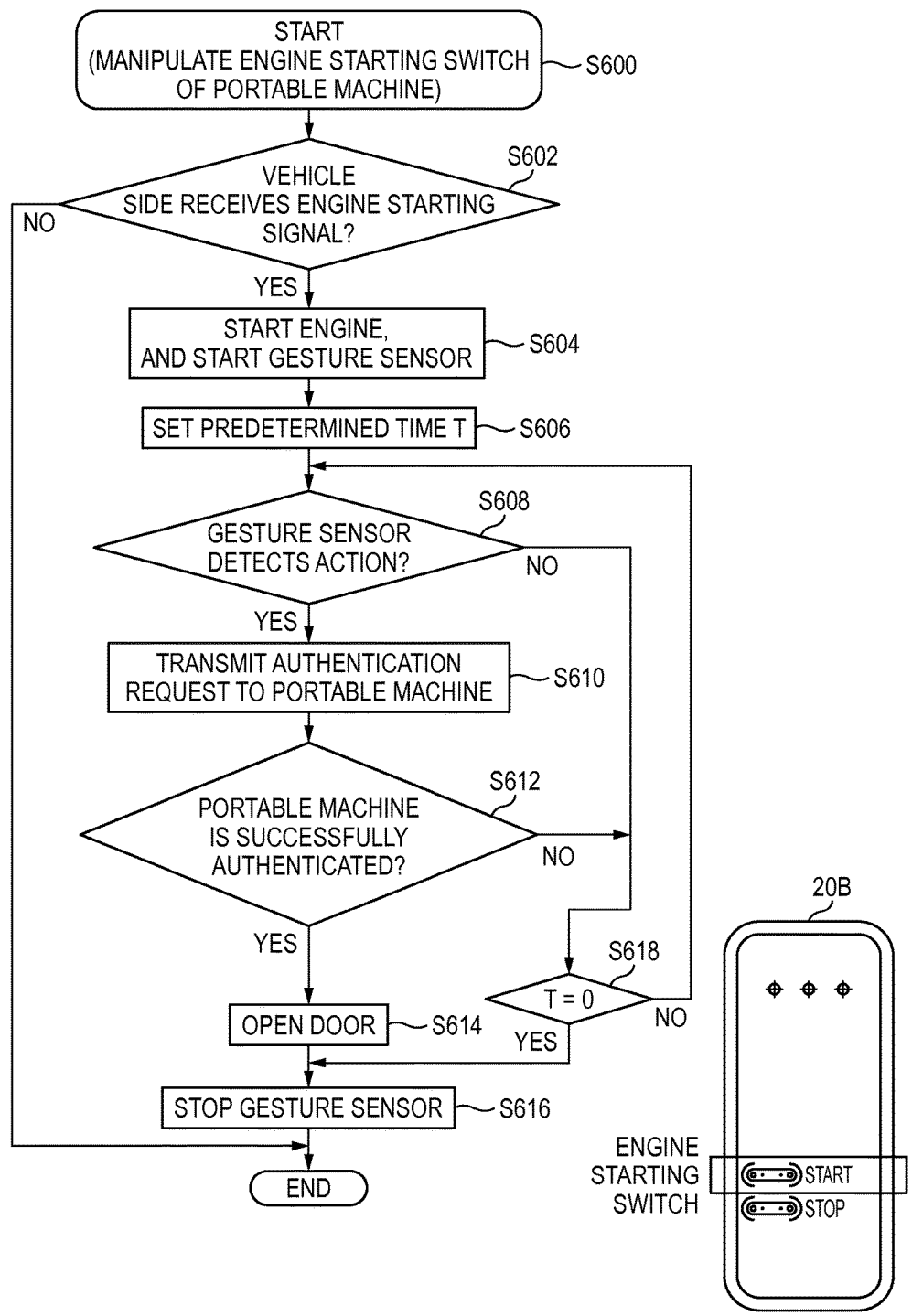
FIG. 8 is a flowchart illustrating a control step in an opening and closing body control device according to a third embodiment of the disclosure and a front view of a portable machine.

A method for controlling a control device according to a third embodiment that conducts wireless communication with a portable machine 20B will be described with reference to FIG. 8. The portable machine 20B includes an engine starting switch (Start) and an engine stopping switch (Stop) as the manipulation unit. The portable machine 20B is configured to enable the gesture entry function together with a function (remote engine starting function) of remotely starting an engine when the engine starting switch is manipulated.

In S600, the user manipulates the engine starting switch of the portable machine 20B. In S602, the receiver on the vehicle side checks whether an engine starting signal is received. The portable machine 20B transmits the engine starting signal when the engine starting switch is manipulated. The portable machine 20B may transmit the function enabling signal together with the engine starting signal when the engine starting switch is manipulated. When the receiver on the vehicle side receives the engine starting signal, the controller starts the sensor while starting the engine in S604. The subsequent control (S606 to S618) is similar to S106 to S118. Therefore, user-friendly portable machine having both the remote engine starting function and the gesture entry function can be provided.

The disclosure is not limited to the above embodiments, various modifications can be made without departing from the scope of the claims. That is, although the present invention is particularly illustrated and described by the specific embodiment, those skilled in the art can make various changes and modifications in the numerical quantity and other detailed configurations of the above embodiments without departing from the technical thought and scope of the present invention.

The invention claimed is:

1. A control device comprising:
a receiver configured to receive a function-enabling signal transmitted from a portable machine used to manipulate a vehicle;
a determination unit configured to measure a time from when the receiver receives the function-enabling signal and determine whether a predetermined time has elapsed;
an opening and closing body controller configured to control opening and closing of an opening and closing body of the vehicle; and
a distance determination unit configured to determine a distance from the vehicle to the portable machine,
wherein the opening and closing body controller controls an opening operation of the opening and closing body based on an action of a person detected by a sensor, which is provided in or around the opening and closing body to detect the action of the person, before the determination unit determines that the predetermined time has elapsed and after the receiver receives the function-enabling signal from the portable machine,
wherein the opening and closing body controller controls the opening operation of the opening and closing body when a distance, which is determined by the distance determination unit when the sensor detects the action of the person, is shorter than a distance, which is determined by the distance determination unit when the receiver receives the function-enabling signal,
wherein the portable machine includes a manipulation unit, and
wherein the function enabling signal is transmitted to the control device in response to manipulation of the manipulation unit.

2. The control device according to claim 1, further comprising an authentication unit configured to authenticate the portable machine,
wherein the authentication unit authenticates the portable machine at least when the sensor detects the action of the person.

3. The control device according to claim 1, wherein the function-enabling signal is transmitted from the portable machine in response to an operation input to the portable machine.

* * * * *